United States Patent
Oettinger et al.

(10) Patent No.: US 6,708,082 B2
(45) Date of Patent: Mar. 16, 2004

(54) SYSTEM IDENTIFICATION TO IMPROVE CONTROL OF A MICRO-ELECTRO-MECHANICAL MIRROR

(75) Inventors: Eric G. Oettinger, Rochester, MN (US); Mark D. Heminger, Rochester, MN (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/162,482

(22) Filed: Jun. 3, 2002

(65) Prior Publication Data

US 2003/0225463 A1 Dec. 4, 2003

(51) Int. Cl.[7] .............................................. G05B 15/00
(52) U.S. Cl. ........................ 700/275; 359/223; 359/224; 359/225; 333/262
(58) Field of Search .......................... 700/275; 359/223, 359/224, 225; 385/52; 333/262

(56) References Cited

U.S. PATENT DOCUMENTS

| | | | |
|---|---|---|---|
| 6,275,326 B1 | * | 8/2001 | Bhalla et al. ................ 359/214 |
| 6,427,038 B1 | * | 7/2002 | Britz et al. ................... 385/52 |
| 6,470,110 B1 | * | 10/2002 | Lin ............................. 385/18 |
| 6,538,802 B2 | * | 3/2003 | Wang et al. ................. 359/298 |

* cited by examiner

*Primary Examiner*—Albert W. Paladini
(74) *Attorney, Agent, or Firm*—William B. Kempler; W. James Brady, III; Frederick J. Telecky, Jr.

(57) ABSTRACT

A method of adjusting a MEMS mirror control system is provided to calibrate a MEMS mirror control system to a particular MEMS mirror in a fashion that optimizes MEMS mirror control loop performance. This calibration is implemented by measuring the gain and resonant frequency of the particular MEMS mirror, and adjusting one or more of the parameters used in the implementation of a PID controller, a state estimator, and a feed forward component used to perform seeks.

16 Claims, 2 Drawing Sheets

US 6,708,082 B2

SYSTEM IDENTIFICATION TO IMPROVE CONTROL OF A MICRO-ELECTRO-MECHANICAL MIRROR

BACKGROUND OF THE INVENTION

1. Field of the Invention

This invention relates generally to a micro-electro-mechanical system (MEMS) mirror, and more particularly, to a method of adjusting a MEMS mirror control system to implement calibration between the MEMS mirror control system and a particular MEMS mirror.

2. Description of the Prior Art

A MEMS mirror control loop is required to work with MEMS mirrors that may vary significantly in gain (motion for a given current), and resonant frequency. Thirty percent variation from part to part is not uncommon. Such gain and resonant frequency variations are problematic when designing a MEMS mirror control system since a very conservative controller is required to support this wide variance in MEMS mirror gain and resonant frequency. A conservative MEMS mirror controller is undesirable since it will not provide optimum control performance.

In view of the foregoing, it would be both desirable and advantageous in the MEMS mirror art to provide a method of adjusting a MEMS mirror control system to implement calibration between the MEMS mirror control system and a particular MEMS mirror in a fashion that optimizes MEMS mirror control loop performance.

SUMMARY OF THE INVENTION

The present invention is directed to a method of calibrating a MEMS mirror control system based on physical parameters of the mirror (gain and resonant frequency) in a fashion that optimizes MEMS mirror control loop performance.

According to one embodiment, a method of calibrating a micro-electro-mechanical (MEM) mirror control system comprises the steps of providing a MEM mirror and a MEM mirror control system having a PID controller comprising proportional, integral, and derivative gain elements, a state estimator element, and a feed-forward control element defined in association with look-up table parameters; measuring the resonant frequency and gain associated with the MEM mirror; and adjusting the PID controller gain elements, the state estimator elements and the feed-forward look-up table parameters as a function of the MEM mirror gain and resonant frequency.

According to another embodiment, a method of calibrating a micro-electro-mechanical (MEM) mirror control system comprises the steps of providing a MEM mirror and a MEM mirror control system having a PID) controller comprising proportional, integral, and derivative gain elements; measuring the resonant frequency and gain associated with the MEM mirror; and adjusting the PID controller gain elements such that each gain element has a desired gain related to the MEM mirror gain and resonant frequency.

According to yet another embodiment, a method of calibrating a micro-electro-mechanical (MEM) mirror control system comprises the steps of providing a MEM mirror and a MEM mirror control system having a state estimator element; measuring the resonant frequency and gain associated with the MEM mirror; and adjusting the state estimator element such that predetermined state estimator parameters are related to the MEM mirror gain and resonant frequency.

According to still another embodiment, a method of calibrating a micro-electro-mechanical (MEM) mirror control system comprises the steps of providing a MEM mirror and a MEM mirror control system comprising a feed-forward control element defined in association with desired look-up table parameters; measuring the resonant frequency and gain associated with the MEM mirror; and scaling the feed-forward look-up table parameters such that the look-up table parameters are related to the MEM mirror gain and resonant frequency.

BRIEF DESCRIPTION OF THE DRAWINGS

Other aspects, features and advantages of the present invention will be readily appreciated, as the invention becomes better understood by reference to the following detailed description when considered in connection with the accompanying drawing figure wherein.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

A MEMS mirror control loop, as stated herein before, is required to work with MEMS mirrors that may vary significantly in gain (motion for a given current), and resonant frequency. Thirty percent variation from part to part is not uncommon. Such gain and resonant frequency variations are problematic when designing a MEMS mirror control system since a very conservative controller is required to support this wide variance in MEMS mirror gain and resonant frequency. A conservative MEMS mirror controller is undesirable since it will not provide optimum control performance.

Figure 1:
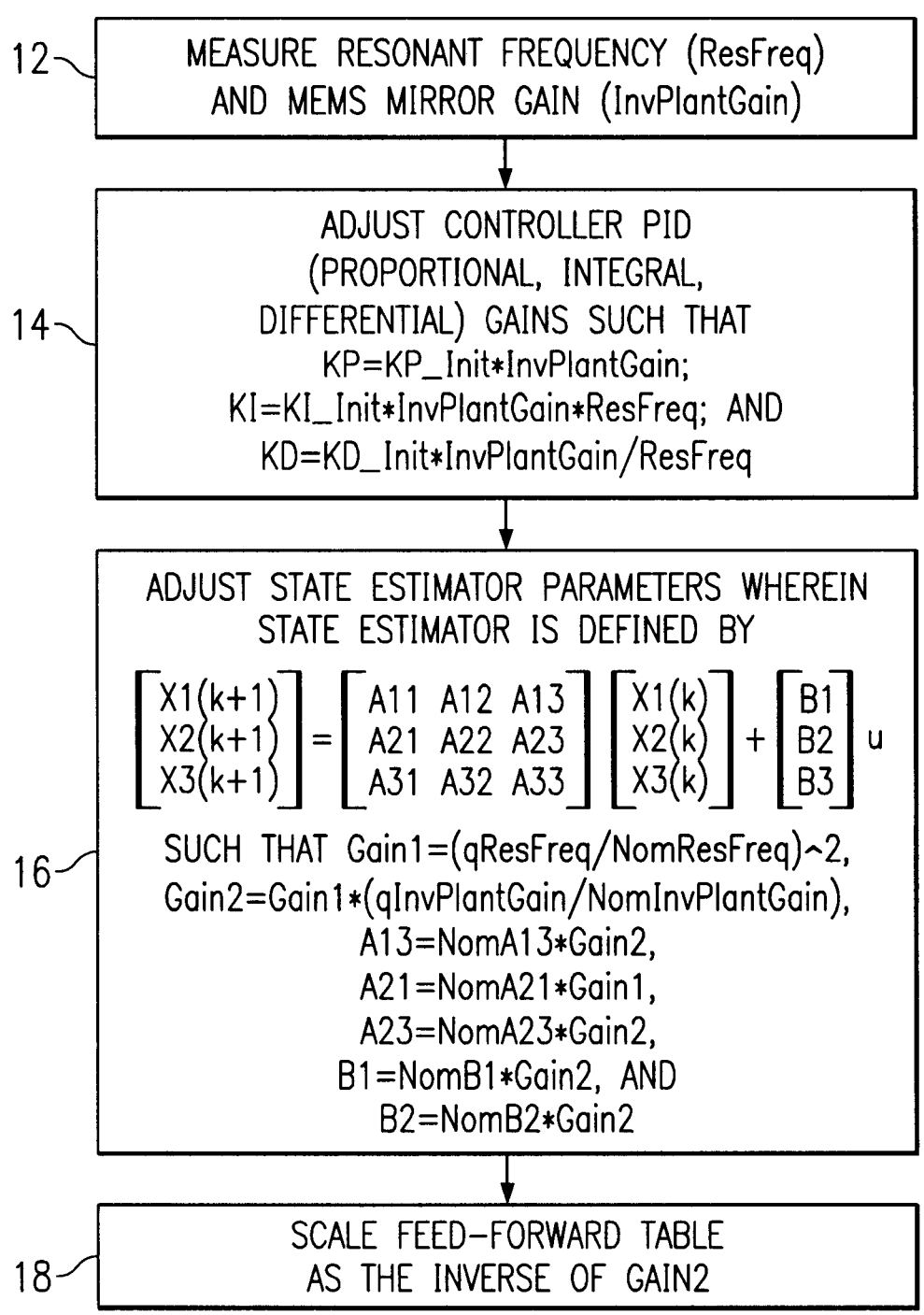
FIG. 1 is a flow chart illustrating a method of adjusting a MEMS mirror control system to implement calibration between the MEMS mirror control system and a particular MEMS mirror in a fashion that optimizes MEMS mirror control loop performance according to one embodiment of the present invention.

FIG. 1 is a flow chart illustrating a method 10 of adjusting a MEMS mirror control system (enumerated 100 in FIG. 2) to implement calibration between the MEMS mirror control system 100 and a particular MEMS mirror ("Plant" in FIG. 2) in a fashion that optimizes MEMS mirror control loop performance according to one embodiment of the present invention. Although method 10 depicts modification of (1) PID gains, (2) state estimator parameters, and (3) feed forward blocks, the present invention is not so limited. Modification of any combination of one or more of the elements (1), (2), or (3) can be implemented in accordance with the principles of the present invention. A more detailed functional description of control system 100 is disclosed in U.S. patent application, entitled *Residual Feedback To Improve Estimator Prediction*, docket number TI-34185, filed on May 31, 2002 by Eric G. Oettinger, and assigned to Texas Instruments Incorporated, the assignee of the present patent application. The TI-34185 patent application is hereby incorporated by reference herein in its entirety. Subsequent to measuring the resonant frequency and gain of the particular mirror (motion for a given current), the controller (i.e. control system 100) is then adjusted appropriately. The present inventors have discovered three elements of a MEMS mirror control system that will benefit from calibration based on the physical parameters of the system; and that without such calibration, a significantly more conservative controller is necessary to support the naturally wide variance in gain and resonant frequency associated with MEMS mirrors. Use of a conservative controller will then result in less than optimal system performance.

The present inventors have found three controller elements to be important when optimizing the controller for use with a wide range of MEMS mirrors. These elements include the PID (proportional, integral, derivative) gains, the Estimator, and the feed-forward waveform used to perform rapid seeks. The PID gains determine how the system (i.e. control system 100) responds to position and velocity errors, and can be calibrated using the following formulas.

KP=KP_Init*InvPlantGain,

KI=KI_Init*InvPlantGain*ResFreq, and

KD=KD_Init*InvPlantGain/ResFreq.

The Estimator predicts the motion of the mirror (also used in the feedback controller). The state Estimator can be defined by $$\begin{bmatrix} X1(k+1) \\ X2(k+1) \\ X3(k+1) \end{bmatrix} = \begin{bmatrix} A11 & A12 & A13 \\ A21 & A22 & A23 \\ A31 & A32 & A33 \end{bmatrix} \begin{bmatrix} X1(k) \\ X2(k) \\ X3(k) \end{bmatrix} + \begin{bmatrix} B1 \\ B2 \\ B3 \end{bmatrix} u$$

where state X1 is the position, state X2 is the velocity, and state X3 is the previous control effort. The term 'u' is the current control effort. The present inventors have also found that changes in ResFreq (MEMS mirror resonant frequency) and InvPlantGain (MEMS mirror gain) significantly affect five of the foregoing matrix coefficients according to relationships defined by Gain1=(qResFreq/NomResFreq)^2, Gain2=Gain1*(qInvPlantGain/NomInvPlantGain), A13=NomA13*Gain2, A21=NomA21*Gain1, A23=NomA23*Gain2, B1=NomB1*Gain2, and B2=NomB2*Gain2.

Figure 2:
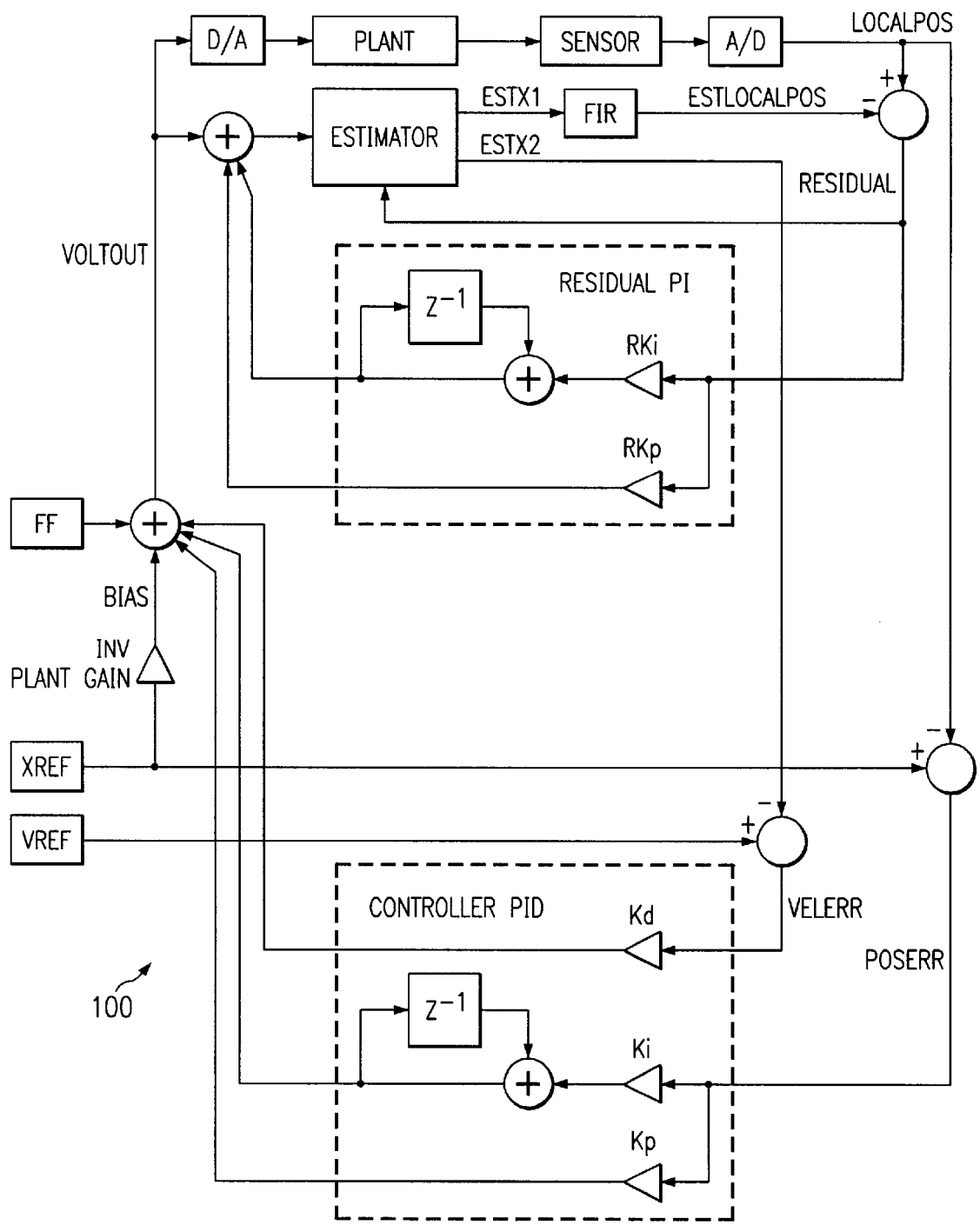
FIG. 2 is a block diagram depicting a MEMS mirror control system suitable for use with the method depicted in FIG. 1.

The feed-forward (FF) waveform use to perform rapid seeks is identified by feed-forward tables that scale as the inverse of Gain2 set forth above. The term seek, as used herein, means the process of moving the MEMS mirror from one angular location to another. With reference now to FIG. 2, the FF element represents a feed-forward current. When performing a seek, the current waveform is supplied via a FF table that is very close to the control effort necessary to perform the seek. If, for example, all feedback was turned-off, application of the FF current pulse would cause movement most of the way from the starting point to the ending point. Without use of feedback, system variability then prevents exact movement from the starting point to the ending point. The FF table discussed herein above includes expected seek position (Xref) and velocity (Vref) data necessary to keep the MEMS mirror on track while moving during a seek. When a seek is finished (during tracking), the FF input is 0, Vref (the desired velocity at any given sample) is also 0 (movement is halted), and Xref (the desired position) is the target. These parameters therefore, are constant values except during a seek (when seeking, these parameters define the trajectory necessary to move from the starting point to the ending point).

Looking again at FIG. 1, the control system 100 calibration can then be seen to commence in block 12, by first measuring the resonant frequency (ResFreq) and the MEMS mirror gain (InvPlantGain) in order to distinctly identify those qualities associated with a specific mirror. Next, as shown in block 14, the PID controller that will be used to control movement of the MEMS mirror is adjusted such that the proportional, integral and derivative gain elements will have respective gains KP, KI, and KD defined as set forth herein before. The State Estimator associated with the PID controller will also be adjusted as seen in block 16 such that the State Estimator parameters A13, A21, A23, B1, and B2 are defined as set forth herein before. Finally, as seen in block 18, the FF table parameters are scaled as the inverse of Gain2, defined herein before in terms of MEMS mirror gain and resonant frequency.

In summary explanation, a method of calibrating a micro-electro-mechanical system (MEMS) mirror PID control system according to one embodiment is implemented by (1) modifying PID gains, (2) modifying a state estimator, and/or (3) modifying feed forward blocks. Importantly, the foregoing elements (1), (2) and (3) are not dependent upon each other, and so any combination of the foregoing elements (1), (2) and (3) may therefore be modified to implement a particular embodiment of the present invention.

In view of the above, it can be seen the present invention presents a significant advancement in the art of MEMS mirror positioning techniques. Further, this invention has been described in considerable detail in order to provide those skilled in the MEMS mirror art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims that follow.

What is claimed is:

1. A method of calibrating a micro-electro-mechanical (MEM) mirror control system, the method comprising the steps of:

providing a MEM mirror and a MEM mirror control system comprising a PID controller comprising proportional, integral, and derivative gain elements, a state estimator element, and a feed-forward control element defined in association with look-up table parameters;

measuring the resonant frequency and gain associated with the MEM mirror;

adjusting the PID controller gain elements such that each gain element has a desired gain which is a first function of the MEM mirror gain and resonant frequency;

adjusting the state estimator element such that predetermined state estimator parameters are second functions of the MEM mirror gain and resonant frequency; and scaling the feed-forward look-up table parameters such that the look-up table parameters are third functions the MEM mirror gain and resonant frequency.

2. The method according to claim 1 wherein the first function is defined by $$\begin{bmatrix} X1(k+1) \\ X2(k+1) \\ X3(k+1) \end{bmatrix} = \begin{bmatrix} A11 & A12 & A13 \\ A21 & A22 & A23 \\ A31 & A32 & A33 \end{bmatrix} \begin{bmatrix} X1(k) \\ X2(k) \\ X3(k) \end{bmatrix} + \begin{bmatrix} B1 \\ B2 \\ B3 \end{bmatrix} u,$$

state X1 is the position, state X2 is the velocity, state X3 is the previous control effort, and the term 'u' is the current control effort.

3. The method according to claim 2 wherein the step of adjusting the state estimator element such that predetermined state estimator parameters are functions of the MEM mirror gain and resonant frequency comprises adjusting parameters A13, A21, A23, B1 and B2, such that Gain1= (qResFreq/NomResFreq)^2, Gain2=Gain1*(qInvPlantGain/ NomInvPlantGain), A13=NomA13*Gain2, A21= NomA21*Gain1, A23=NomA23*Gain2, B1=NomB1*Gain2, and B2=NomB2*Gain2.

4. The method according to claim 1 wherein the step of adjusting the PID controller gain elements such that each gain element has a desired gain which is a first function of the MEM mirror gain and resonant frequency comprises adjusting the proportional gain element KP such that KP=KP_Init*InvPlantGain, wherein InvPlantGain is the inverse MEM mirror gain and KP_Init is the initial proportional gain element gain.

5. The method according to claim 1 wherein the step of adjusting the PID controller gain elements such that each gain element has a desired gain which is a first function of the MEM mirror gain and resonant frequency comprises adjusting the integral gain element KI such that KI=KI_ Init*InvPlantGain*ResFreq, wherein InvPlantGain is the inverse MEM mirror gain and KI_Init is the initial integral gain element gain, and ResFreq is the resonant frequency of the MEM mirror.

6. The method according to claim 1 wherein the step of adjusting the PID controller gain elements such that each gain element has a desired gain which is a first function of the MEM mirror gain and resonant frequency comprises adjusting the differential gain element KD such that KD=KD_Init*InvPlantGain/ResFreq, wherein InvPlantGain is the inverse MEM mirror gain and KD_Init is the initial differential gain element gain, and ResFreq is the resonant frequency of the MEM mirror.

7. The method according to claim 1 wherein the step of scaling feed-forward look-up table parameters such that the look-up table parameters are third functions of the MEM mirror gain and resonant frequency comprises scaling the look-up table parameters as the inverse of Gain2, wherein Gain2=Gain1*(qInvPlantGain/NomInvPlantGain), and Gain1=(qResFreq/NomResFreq)^2, and further wherein InvPlantGain is the inverse gain associated with the MEM mirror and NomResFreq is the nominal resonant frequency of the MEM mirror.

8. A method of calibrating a micro-electro-mechanical (MEM) mirror control system, the method comprising the steps of:

providing a MEM mirror and a MEM mirror control system comprising a PID controller having proportional, integral, and derivative gain elements;

measuring the resonant frequency and gain associated with the MEM mirror; and adjusting the PID controller gain elements such that each gain element has a desired gain which is a first function of the MEM mirror gain and resonant frequency.

9. The method according to claim 8 wherein the step of adjusting the PID controller gain elements such that each gain element has a desired gain which is a first function of the MEM mirror gain and resonant frequency comprises adjusting the proportional gain element KP such that KP=KP_Init*InvPlantGain, wherein InvPlantGain is the inverse MEM mirror gain and KP_Init is the initial proportional gain element gain.

10. The method according to claim 8 wherein the step of adjusting the PID controller gain elements such that each gain element has a desired gain which is a first function of the MEM mirror gain and resonant frequency comprises adjusting the integral gain element KI such that KI=KI_ Init*InvPlantGain*ResFreq, wherein InvPlantGain is the inverse MEM mirror gain and KI_Init is the initial integral gain element gain, and ResFreq is the resonant frequency of the MEM mirror.

11. The method according to claim 8 wherein the step of adjusting the PID controller gain elements such that each gain element has a desired gain which is a first function of the MEM mirror gain and resonant frequency comprises adjusting the differential gain element KD such that KD=KD_Init*InvPlantGain/ResFreq, wherein InvPlantGain is the inverse MEM mirror gain and KD_Init is the initial differential gain element gain, and ResFreq is the resonant frequency of the MEM mirror.

12. A method of calibrating a micro-electro-mechanical (MEM) mirror control system, the method comprising the steps of:

providing a MEM mirror and a MEM mirror control system comprising a state estimator element;

measuring the resonant frequency and gain associated with the MEM mirror; and adjusting the state estimator element such that each predetermined state estimator parameter is a function of the MEM mirror gain and resonant frequency, whereby operation of the control system is optimized for the MEM mirror provided.

13. The method according to claim 12 wherein the controller estimator element function is defined by $$\begin{bmatrix} X1(k+1) \\ X2(k+1) \\ X3(k+1) \end{bmatrix} = \begin{bmatrix} A11 & A12 & A13 \\ A21 & A22 & A23 \\ A31 & A32 & A33 \end{bmatrix} \begin{bmatrix} X1(k) \\ X2(k) \\ X3(k) \end{bmatrix} + \begin{bmatrix} B1 \\ B2 \\ B3 \end{bmatrix} u,$$

wherein
state X1 is the position, state X2 is the velocity, state X3 is the previous control effort, and the term 'u' is the current control effort.

14. The method according to claim 13 wherein the step of adjusting the state estimator element such that each predetermined state estimator parameter is a function of the MEM mirror gain and resonant frequency comprises adjusting parameters A13, A21, A23, B1 and B2, such that Gain1= (qResFreq/NomResFreq)^2, Gain2=Gain1*(qInvPlantGain/ NomInvPlantGain), A13=NomA13*Gain2, A21= NomA21*Gain1, A23=NomA23*Gain2, B1=NomB1*Gain2, and B2=NomB2*Gain2.

15. A method of calibrating a micro-electro-mechanical (MEM) mirror control system, the method comprising the steps of:

providing a MEM mirror and a MEM mirror control system comprising a feed-forward control element defined in association with desired look-up table parameters;

measuring the resonant frequency and gain associated with the MEM mirror; and scaling the feed-forward look-up table parameters such that each of the look-up table parameters is a function of the MEM mirror gain and resonant frequency, whereby operation of the control system is optimized for the MEM mirror provided.

16. The method according to claim 15 wherein the step of scaling feed-forward look-up table parameters such that each of the look-up table parameters is a function of the MEM mirror gain and resonant frequency comprises scaling the look-up table parameters as the inverse of Gain2, wherein Gain2=Gain1*(qInvPlantGain/NomInvPlantGain), and Gain1=(qResFreq/NomResFreq)^2, and further wherein InvPlantGain is the inverse gain associated with the MEM mirror and NomResFreq is the nominal resonant frequency of the MEM mirror.

* * * * *